United States Patent (10) Patent No.: US 10,871,302 B2
Song et al. (45) Date of Patent: Dec. 22, 2020

(54) ARTIFICIAL INTELLIGENCE AIR CONDITIONER AND CONTROL METHOD THEREOF

(71) Applicant: LG ELECTRONICS INC., Seoul (KR)

(72) Inventors: Taeyup Song, Seoul (KR); Jaeyong Song, Seoul (KR); Dongwoo Han, Seoul (KR)

(73) Assignee: LG ELECTRONICS INC., Seoul (KR)

(*) Notice: Subject to any disclaimer, the term of this patent is extended or adjusted under 35 U.S.C. 154(b) by 156 days.

(21) Appl. No.: 15/845,672

(22) Filed: Dec. 18, 2017

(65) Prior Publication Data
US 2018/0209681 A1 Jul. 26, 2018

(30) Foreign Application Priority Data
Dec. 19, 2016 (KR) .......... 10-2016-0173749

(51) Int. Cl.
F24F 11/65 (2018.01)
F24F 11/79 (2018.01)
(Continued)

(52) U.S. Cl.
CPC .......... F24F 11/65 (2018.01); F24F 11/64 (2018.01); F24F 11/74 (2018.01); F24F 11/77 (2018.01);
(Continued)

(58) Field of Classification Search
CPC .. F24F 11/54; F24F 11/56; F24F 11/64; F24F 11/65; F24F 11/74; F24F 11/79;
(Continued)

(56) References Cited

U.S. PATENT DOCUMENTS

2011/0064264 A1* 3/2011 Caballero .......... G06K 9/00771
382/100
2014/0267685 A1* 9/2014 Kahle .................... B23Q 17/22
348/95
(Continued)

FOREIGN PATENT DOCUMENTS

CN 105910225 8/2016
JP H08-178390 7/1996
(Continued)

OTHER PUBLICATIONS

Korean Office Action dated Dec. 14, 2017 issued in Application No. 10-2016-0173749.
(Continued)

Primary Examiner — Michael J Huntley
(74) Attorney, Agent, or Firm — KED & Associates LLP

(57) ABSTRACT

An artificial intelligence air conditioner may include a camera to obtain an image, an area recognition module for recognizing an area in which an occupant is located in an indoor space divided into a plurality of areas from the image obtained by the camera and distinguishing a living area with respect to the plurality of areas based on a result of recognizing a location of the occupant, and an airflow controller controlling airflow based on the distinguished living area, whereby airflow optimized for each living area of the indoor space may be controlled.

5 Claims, 18 Drawing Sheets

(51) Int. Cl.
  *F24F 11/77* (2018.01)
  *F24F 11/74* (2018.01)
  *F24F 11/64* (2018.01)
  *G05B 13/02* (2006.01)
  *G06K 9/00* (2006.01)
  *F24F 120/12* (2018.01)
  *F24F 11/56* (2018.01)
  *F24F 11/54* (2018.01)

(52) U.S. Cl.
  CPC ............ *F24F 11/79* (2018.01); *G05B 13/027* (2013.01); *G06K 9/00362* (2013.01); *G06K 9/00771* (2013.01); *F24F 11/54* (2018.01); *F24F 11/56* (2018.01); *F24F 2120/12* (2018.01)

(58) Field of Classification Search
  CPC ............... F24F 2120/12; G05B 13/027; G06K 9/00362; G06K 9/00771
  See application file for complete search history.

(56) References Cited

U.S. PATENT DOCUMENTS

| | | | |
|---|---|---|---|
| 2014/0277757 A1* | 9/2014 | Wang | G05D 23/1927 700/276 |
| 2015/0362706 A1* | 12/2015 | Chujo | G02B 7/1805 348/36 |
| 2016/0110602 A1 | 4/2016 | Chujo et al. | |
| 2017/0264766 A1* | 9/2017 | Okamoto | H04N 1/00336 |
| 2017/0270711 A1* | 9/2017 | Schoenberg | G02B 27/017 |
| 2018/0165546 A1* | 6/2018 | Skans | G06K 9/6255 |
| 2018/0247132 A1* | 8/2018 | Liu | G06K 9/00369 |

FOREIGN PATENT DOCUMENTS

| | | | |
|---|---|---|---|
| JP | 2012-197985 | 10/2012 | |
| JP | 2013-250026 | 12/2013 | |
| WO | WO-2008066311 A1 * | 6/2008 | ............ F24F 1/0007 |

OTHER PUBLICATIONS

European Search Report dated Oct. 1, 2018 issued in Application No. 17208005.3.

* cited by examiner

ARTIFICIAL INTELLIGENCE AIR CONDITIONER AND CONTROL METHOD THEREOF

CROSS-REFERENCE TO RELATED APPLICATION

The application claims priority to Korean Patent Application No. 10-2016-0173749, filed Dec. 19, 2016, the entire subject matter of which is hereby incorporated by reference.

BACKGROUND

1. Field

The present disclosure relates to an air conditioner and a control method thereof and, more particularly, to an air conditioner that controls airflow by determining a location of an occupant, and a control method thereof.

2. Background

An air conditioner is installed to provide a comfortable indoor environment to humans by discharging cold air to a room to adjust an indoor temperature and purify the air of the room to create a pleasant indoor environment.

The air conditioner may include an indoor unit and an outdoor unit, for example. The outdoor unit may include a heat exchanger and may be installed in a room. The outdoor unit may include a compressor, a heat exchanger, and/or the like. The outdoor unit may supply a refrigerant to the indoor unit.

The air conditioner, in which the indoor unit (including the heat exchanger) and the outdoor unit (including the compressor, the heat exchanger, and/or the like) are separately controlled, and may be operated by controlling power supplied to the compressor or the heat exchanger. At least one indoor unit may be connected to the outdoor unit, and the air conditioner may operate in a cooling or heating mode by supplying a refrigerant to the indoor unit according to a requested operation state.

The air conditioner may be provided with a wind direction adjusting unit (or a wind visor) at a discharge port in order to adjust a direction of wind discharged into a room. A wind direction may be changed by operating a wind direction setting button provided in a remote controller, and/or the like.

In the air conditioner, a wind direction may be adjusted through a manual operation as discussed above. However, when a user is far away or frequently moves, it may not be easy to adjust the wind direction each time, thereby making it difficult for the user to feel comfortable.

Such wind direction control may have limitations, and thus a technique has been developed for controlling airflow according to locations of a user (occupant) in a room.

Korean Patent Laid-open Publication No. 10-2008-0048864 (Publication Date of Jun. 3, 2008) discloses an air conditioner and an airflow control method thereof, in which a direction of airflow is controlled by determining a location of an occupant using a stereo vision camera.

Korean Patent Laid-open Publication No. 10-2010-0076559 (Publication Date of Jul. 6, 2010) discloses an air conditioner that determines a location of an occupant and controls airflow after controlling an indoor temperature to be uniform, and an operating method thereof. A location of an occupant may be estimated using a camera, and a direction of a direct wind/indirect wind may be controlled according to a user setting.

However, since the above references may be vulnerable to inaccuracy of human body detection using the camera, it may be very important to improve accuracy of human body detection.

Additionally, since the above references may not estimate information regarding an indoor space, a life pattern and a position of an occupant, and/or the like, it may be difficult to accurately track space information and temperature information and to control an optimized airflow according to installation environments of the air conditioner, and levels of comfort each occupant feels may be different.

A method may be required for more effectively providing airflow in consideration of an installation environment and an indoor space when airflow is controlled using human body detection.

Interest in machine learning (such as artificial intelligence, deep learning, and/or the like) has significantly increased in recent years.

Machine learning may be centered on statistics-based classification, regression, and cluster models. In particular, in the supervised learning of classification and regression model, characteristics of learning data and a learning model that distinguishes new data based on the characteristics of learning data may be defined by a person in advance. In contrast, deep learning may be that a computer discovers and distinguishes such characteristics by itself.

One of the factors that has accelerated the development of deep learning is a deep-learning framework provided as an open source. With the release of deep learning frameworks, it may be increasingly important to extract and select a learning process, a learning method, and data used in learning, in addition to a deep learning algorithm, to ensure effective learning and recognition.

Additionally, research into use of artificial intelligence and machine learning in various products and services has increased.

BRIEF DESCRIPTION OF THE DRAWINGS

Arrangements and embodiments may be described in detail with reference to the following drawings in which like reference numerals refer to like elements and wherein.

DETAILED DESCRIPTION

Figure 1:
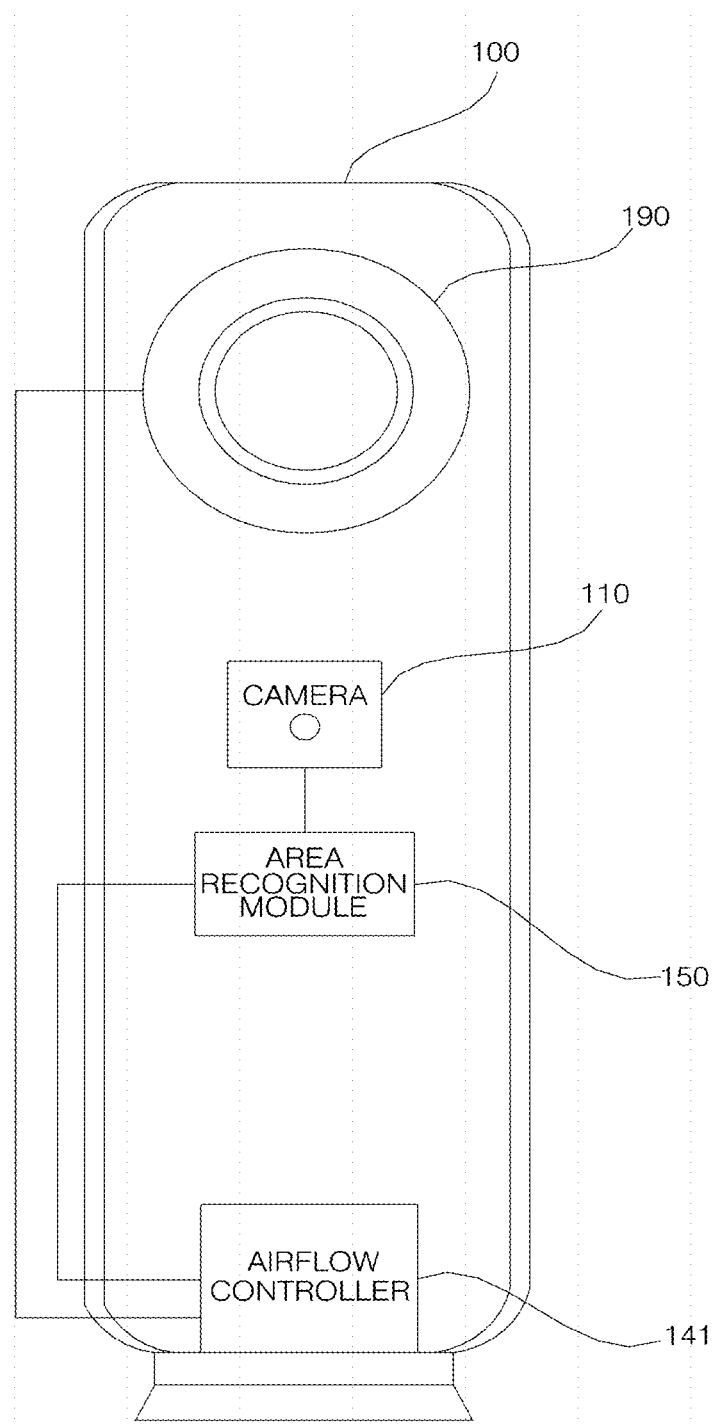
FIG. 1 is a schematic conceptual view of an air conditioner according to an example embodiment.

Reference may now be made in detail to preferred embodiments of the present disclosure, examples of which are illustrated in the accompanying drawings. However, it will be understood that the present disclosure should not be limited to the embodiments and may be modified in various ways.

In the drawings, to clearly and briefly explain the present disclosure, illustration of elements having no connection with the description is omitted, and the same or extremely similar elements are designated by the same reference numerals throughout the specification.

In the following description, usage of suffixes such as 'module', 'part' or 'unit' used for referring to elements may be provided merely to facilitate explanation of the present disclosure, without having any significant meaning by itself. Therefore, 'module', 'part', and 'unit' may be mixedly used.

Figure 2:
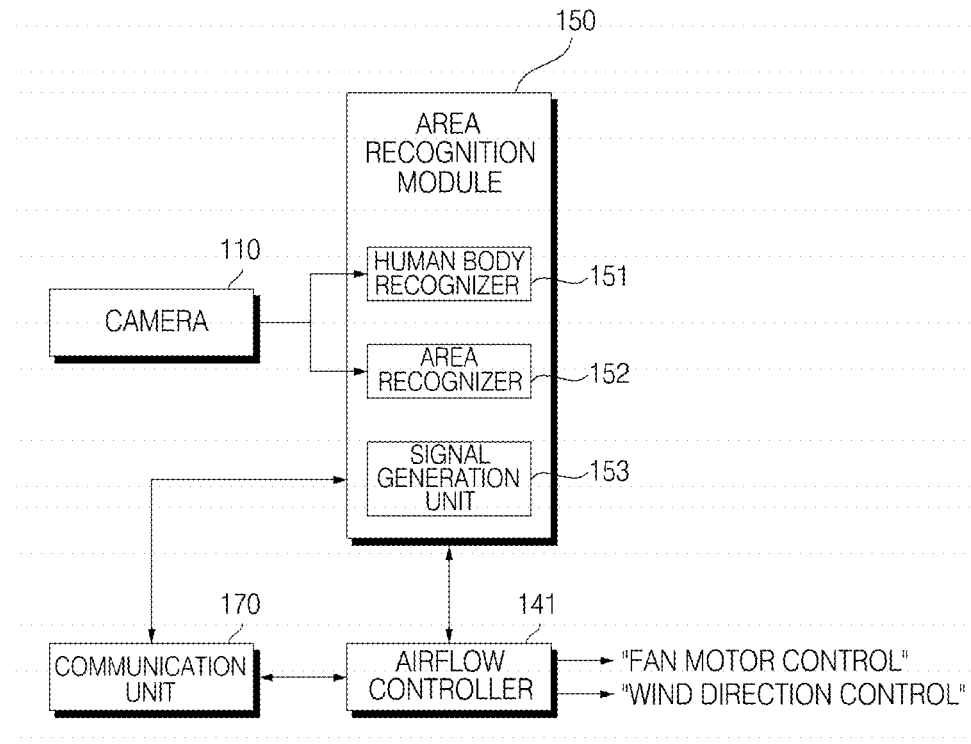
FIG. 2 is a block diagram illustrating control relations among main components of an air conditioner according to an example embodiment of the present disclosure.

FIG. 1 is a schematic conceptual view of an air conditioner according to an example embodiment. FIG. 2 is a block diagram illustrating control relations among main components of an air conditioner according to an example embodiment. Other embodiments and configurations may also be provided.

In this embodiment, an air conditioner 100 may be a floor-stand type air conditioner, for example. However, the present disclosure is not limited thereto and an air conditioner such as a wall-mount type air conditioner, a ceiling type air conditioner, and/or the like, as well as the floor-stand type air conditioner, may also be applied as the air conditioner 100.

Referring to FIGS. 1 and 2, an air conditioner 100 may include a camera 110, an area recognition module 150 (or area recognition device), and an airflow controller 141. The camera 110 may obtain an external image. The area recognition module 150 may recognize (or determine) an area where an occupant is located in an indoor space divided (or separated) into a plurality of areas from the image obtained by the camera 110 and distinguish a living area with respect to the plurality of areas by using a result of recognizing (or determining) a location of the occupant as an input of previously learned data based on machine learning. The airflow controller 141 may control airflow based on the distinguished living area.

Referring to FIG. 1, an indoor unit (of the air conditioner) may include an intake (not shown) allowing indoor air to be intake therethrough and a discharge port 190 allowing air intaken through the intake to be discharged to an indoor area.

A wind direction adjusting unit (such as a louver and/or a vane) may be provided in the discharge port 190 for opening and closing the discharge port 190 and adjusting a direction of discharged air. An angle and a direction of the wind direction adjusting unit may be changed by driving a motor, and/or the like, under the control of the airflow controller 41. Accordingly, a direction of air discharged through the discharge port 190 may be adjusted. The wind direction adjusting unit may be a wind direction adjusting device.

A blowing direction of airflow, a blowing range, and/or the like may be adjusted by controlling an operation of the wind direction adjusting unit (such as a louver and/or a vane).

For example, the vane may be fixed in any one direction to blow air in the any one direction, and an operation in which a direction of the vane is continuously changed within a set range (hereinafter referred to a swing operation) may be performed whereby air may be blown within the range set such that a blowing direction is continuously changed within the set range. The range in which air is blown may be further narrowed or widened by adjusting an angle range in which the swing operation of the vane is performed.

The air conditioner may have a fan for controlling flow of indoor air intaken by the intake to the indoor space through the discharge port 190. Rotation of the fan may be controlled by a fan motor, and an operation of the fan motor may be controlled by the airflow controller 141.

Accordingly, the airflow controller 141 may control a direction of air (airflow) discharged from the air conditioner by controlling the wind direction adjusting unit (such as a louver, a vane, and/or the like) and the fan motor. The airflow controller 141 may control an amount and a rate of airflow by controlling a rate of the fan motor, and/or may control a direction of airflow by controlling the wind direction adjusting unit (such as the louver, the vane, and/or the like).

The airflow controller 141 may control a rate of airflow so that an area where a specific object is located may be rapidly cooled.

The airflow controller 141 may adjust a cooling rate according to distinguished living areas.

For example, when a living area in which a plurality of occupants are located or where an occupant is located for a long period of time is recognized (or determined) in the indoor space in which the air conditioner is installed, the airflow controller 141 may control airflow such that cooling strength of the living area is further increased.

The airflow controller 141 may perform control such that intensive cooling is performed in the living area.

An example embodiment may be described mainly based on cooling, although embodiments may also be applied to heating in the same or similar manner.

The air conditioner according to an example embodiment may perform living area classification (recognition) based on occupant location recognition on the plurality of areas in the indoor space separated into a plurality of areas.

The air conditioner may perform a living area classification (recognition) based on machine learning on the plurality of areas in the indoor space separated into a plurality of areas.

The air conditioner may perform location recognition of an occupant based on machine learning.

The area recognition module 150 may use an image obtained through the camera 110 as input data of an artificial neural network previously learned by machine learning, to recognize (or determine) an occupant included in the image and a location of the occupant.

The area recognition module 150 may divide the indoor space into a plurality of areas using the image obtained through the camera 110 as input data of the artificial neural network previously learned by machine learning. The plurality of divided areas may be classified into a living area and a non-living area.

Machine learning and deep learning may be described with reference to FIGS. 5 to 7.

The area recognition module 150 may divide the plurality of areas into a living area and a non-living area based on a result of recognizing (or determining) a location of an occupant.

The area recognition module 150 may divide a target indoor space into a classification area in which a person lives and a classification area in which the person does not live, by using information regarding a location where the occupant is sensed in the indoor space sensed by the camera 110.

The area recognition module 150 may further subdivide the living area to classify the plurality of areas into a residential living area, a movement living area, and/or a non-living area.

In the target space, the area recognition module 150 may subdivide the classification area in which the person lives into a classification area in which the person mainly lives and a classification area in which a person temporarily passes by, by using information regarding frequency by which the person is sensed in the indoor space.

The area recognition module 150 may accumulate the result of recognizing a location of the occupant, and classify the living area with respect to the plurality of areas based on the accumulated position recognition result.

The airflow controller 141 may control airflow according to a result of the area classification of the area recognition module 150. For example, the airflow controller 141 may classify the plurality of areas into the living area and the non-living area based on the recognized location (or determined location) of the occupant, and control a direction and strength of airflow such that the living area may be cooled rapidly.

That is, the area recognition module 150 may recognize (or determine) the location of the occupant and characteristics of the indoor space based on machine learning. The airflow controller 141 may control the fan motor and the wind direction adjusting unit according to the recognition result in order to perform optimized airflow control.

The airflow controller 141 may perform control such that airflow control is repeatedly performed.

The area recognition module 150 (or area recognition device) may include a human body recognizer (FIG. 2) 151 for recognizing presence or absence of an occupant and a location of the occupant from the image captured by the camera 110, and an area recognizer 152 (FIG. 2) for distinguishing the living area with respect to the plurality of areas based on the result of recognizing the location of the occupant in the image obtained by the camera 110.

The human body recognizer 151 and/or the area recognizer 152 may perform a recognition process (or determination process) based on data previously learned through machine learning.

The human body recognizer 151 may recognize presence and absence of an occupant, and the area recognizer 152 may distinguish the living area with respect to the plurality of areas based on the result of recognizing the location of the occupant, thus distinguishing the living area of the indoor space.

The airflow controller 141 may control a driving speed of the fan motor and an angle of the wind direction adjusting unit (such as a louver, a vane, and/or the like) based on the distinguished living area.

According to an example embodiment, the area recognition module 150 may further include a signal generation unit 153 (FIG. 2) for generating (or providing) a control signal based on the distinguished living area. The airflow controller 141 may control the fan motor and the wind direction adjusting unit according to the control signal generated by the signal generation unit 153.

According to an example embodiment, the area recognition module 150 may not be provided separately from the airflow controller 141, but may be configured as a partial block of the airflow controller 141.

Figure 3:
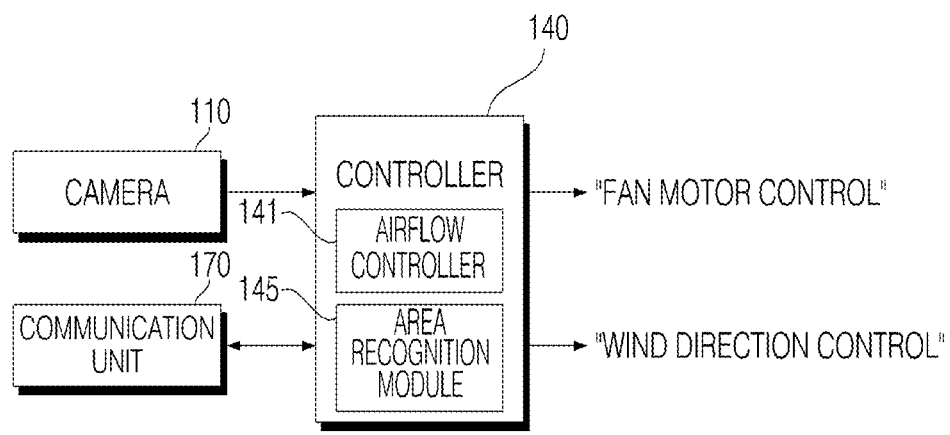
FIG. 3 is a block diagram illustrating control relations among main components of an air conditioner according to an example embodiment.

FIG. 3 is a block diagram illustrating control relations among main components of an air conditioner according to an example embodiment. FIG. 3 shows an example in which the airflow controller 141 and the area recognition module 145 are provided in the controller 140.

The area recognition module 145 may include a human body recognizer for recognizing presence or absence of an occupant and a location of the occupant from an image obtained by the camera 110, and an area recognizer distinguishing a living area with respect to the plurality of areas based on the result of recognizing a location of the occupant in the image obtained by the camera 110.

The area recognition module 145 may include a signal generator for generating a control signal based on the distinguished living area.

The area recognition module 150 or 145 may recognize (or determine) the location of the occupant and the living area based on the data previously learned through machine learning in the image obtained by the camera.

The airflow controller 141 may generate (or provide) a control signal based on the recognized living area and control the fan motor and the wind direction adjusting unit based on the distinguished living area.

Alternatively, the area recognition module 150 or 145 may recognize the location and living area of the occupant based on the data learned by the machine learning in the image obtained by the camera 110. The control signal may be generated based on the living area. The airflow controller 141 may control the fan motor and the airflow direction controller according to the control signal.

The area recognition module 150 or 145 may include an artificial neural network previously learned by machine learning, generate histograms for the plurality of areas by accumulating the result of recognizing the location of the occupant, and distinguish the living area using the histogram as input data of the artificial neural network.

When the air conditioner is operated, loss of a cooling airflow may occur depending on an angular range of the louver, vane, and/or the like, an installation position of the louver, vane, and/or the like, and an occupant environment.

The present disclosure may relate to recognition (or determination) of a user's actual living area to enhance cooling efficiency of the air conditioner and user comfort. Embodiments may relate to a method for recognizing an area in which an occupant is present using a camera using a previously learned human body recognizer and an area recognizer.

Unlike disadvantages methods of controlling an air volume and a direction of wind according to a human body detection result without a function of recognizing space, the air conditioner according to the present disclosure may perform human body detection using image information obtained by the camera and subsequently distinguish a living (residential/movement) area and a non-living area from each other.

The air conditioner according to the present disclosure may improve cooling efficiency and energy efficiency by controlling airflow such that cooling may be performed efficiently in the distinguished living area.

That is, the air conditioner may recognize (or determine) the living area only by performing installation and operation without an additional device and an operation of an expert, and can interwork with comfortable control.

According to an example embodiment, an area in which the user actually resides may be estimated by searching for a location of the occupant and an angle using the learned human body recognizer from an image input at a predetermined period through the camera, and classify the living area using a machine learning algorithm learned by accumulating occupant location information.

Additionally, by using the result of estimating the living area, airflow toward an unnecessary area (such as a wall surface, and/or the like) may be limited by controlling airflow limitedly to the space in which the user actually resides, and by allowing user-customized operation, convenience and comfort may be provided to the user, as well as increase cooling efficiency.

Additionally, the air conditioner may be adapted to a living area changed through continuous updating to optimally control airflow.

Referring to FIGS. 2 and 3, the air conditioner according to an example embodiment may include a memory, a communication unit 170 (or communication device), and/or the like.

The memory may store data for controlling an operation of the air conditioner and data received through the communication unit 170.

The air conditioner may include a buffer for temporarily storing data, and the buffer may be included in the controller 140 or the memory.

The controller 140 and/or the airflow controller 141 may process various data received through the communication unit 170 to update the memory. For example, when data input through the communication unit 170 is updated data for an operation program previously stored in the memory, the memory may be updated using the updated data, and when the input data is a new operation program, the input data may be additionally stored in the memory.

The controller 140 may control flow of data input to or output from the air conditioner, and the controller 140 may generate and apply a control command.

The communication unit 170 may include one or more communication modules, and may be connected to an external device for communication.

The communication unit 170 may receive data related to machine learning from a predetermined server, and the area recognition module 150 or 145 may be updated based on data related to machine learning received from the predetermined server.

Figure 4:
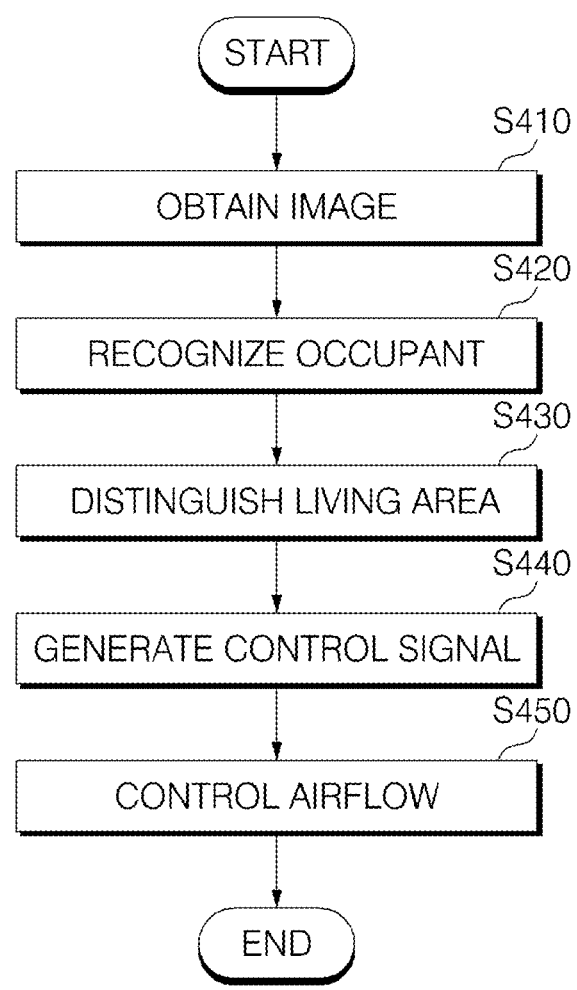
FIG. 4 is a flow chart illustrating a control method of an air conditioner according to an example embodiment.

FIG. 4 is a flow chart illustrating a control method of an air conditioner according to an example embodiment. Other embodiments and configurations may also be provided.

Referring to FIG. 4, an external image can be obtained by using the camera 110 (S410).

The area recognition module 150 or 145 may recognize presence or absence of an occupant from the image obtained by the camera 110 (S420). For example, the area recognition module 150 or 145 may recognize a location of the occupant based on data previously learned by machine learning (S420).

The area recognition module 150 or 145 may distinguish a living area with respect to the plurality of areas using a result of recognizing the location of the occupant as an input of the data previously learned through machine learning (S430).

The airflow controller 141 can control airflow based on the distinguished living area (S450). For example, in order to rapidly or intensively cool the area distinguished as the living area in which the user actually lives in the indoor space divided into a plurality of areas, the airflow controller 141 may control the fan motor and the wind direction adjusting unit.

The signal generation unit 153 (or signal generator) or the airflow controller 141 of the area recognition module 150 or 145 may generate a control signal based on the result of the living area recognition (S440).

In some embodiments, when data related to machine learning is received from a predetermined server, the air conditioner may update the previously learned data based on data related to machine learning received from the predetermined server. Other views may also be provided.

Figure 5:
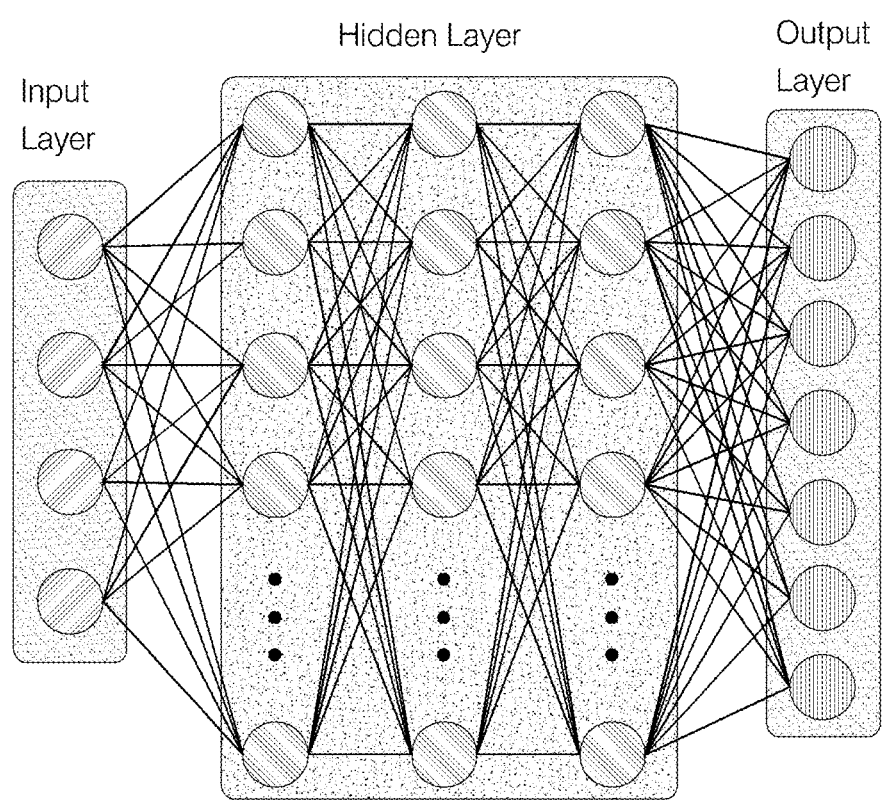
FIGS. 5 to 7 are views relating to descriptions of deep learning.
Figure 6:
Figure 7:
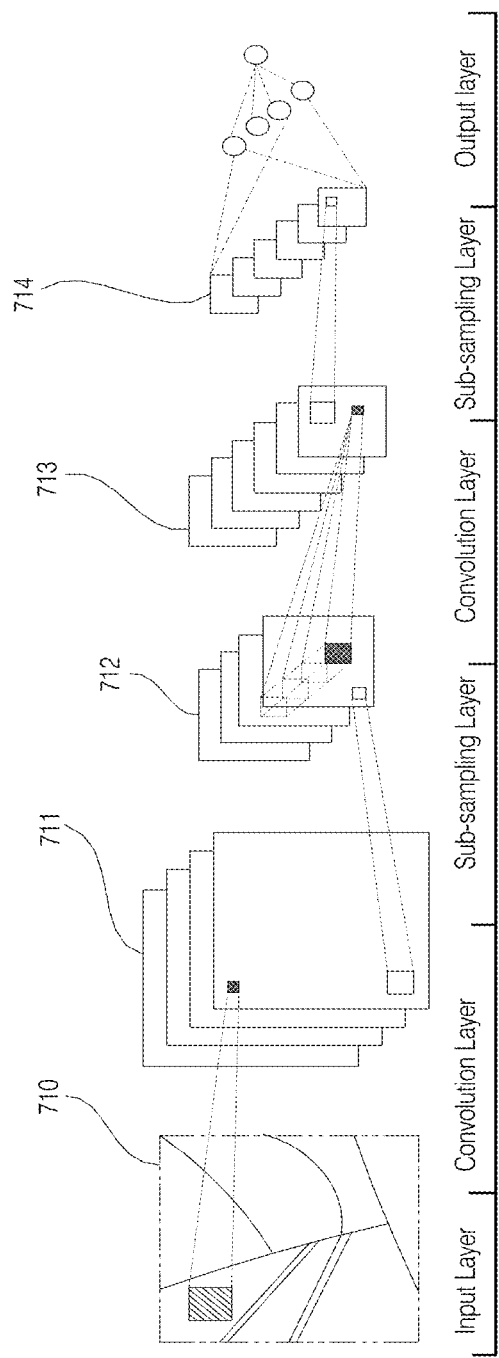

FIGS. 5 to 7 are views relating to descriptions of deep learning.

A deep learning technology, a sort of machine learning, may refer to a multi-level, deep learning process based on data.

Deep learning may represent a set of machine learning algorithms that extract key data from multiple data as levels are elevated.

The deep learning structure may include an artificial neural network (ANN). For example, the deep learning structure may be composed of a DNN such as a CNN (Convolutional Neural Network), RNN (Recurrent Neural Network), DBN (Deep Belief Network), and/or the like.

Referring to FIG. 5, the ANN may include an input layer, a hidden layer, and an output layer. Each layer may include a plurality of nodes, and each layer is connected to a next layer. The nodes between adjacent layers may be connected to each other with a weight.

Referring to FIG. 6, a computer (i.e., a machine) may discover a predetermined pattern from input data 610 to form a feature map. The computer (or machine) can extract a lower level feature 620, an intermediate level feature 630, and a higher level feature 640 to recognize (or determine) an object and output a recognition output 650 (or result).

The artificial neural network can be abstracted into higher-level features toward layers in next order.

Referring to FIGS. 5 and 6, each node may operate based on an activation model, and an output value corresponding to an input value may be determined according to the activation model.

An output value of a certain node (e.g., the low level feature 620) may be input to a next layer connected to the corresponding node (e.g., a node of the intermediate level feature 630). A node of the next layer, for example, a node of the intermediate level feature 630, may receive values output from a plurality of nodes of the lower level feature 620.

In this example, the input value of each node may be a value obtained by applying a weight to the output value of the node of the previous layer. The weight may refer to connection strength between nodes.

The deep learning process may be considered as a process of discovering an appropriate weight.

An output value of a certain node (e.g., the intermediate level feature 630) may be input to a node of a next layer connected to the corresponding node (e.g., a node of the higher level feature 640). The node of the next layer (e.g., the node of the higher lever feature 640) may receive values output from a plurality of nodes of the intermediate level feature 630.

The artificial neural network can extract feature information corresponding to each level using a learned layer corresponding to each level. The artificial neural network may sequentially perform abstraction to recognize a predetermined target by utilizing feature information of the highest level.

For example, referring to a face recognition process through deep learning, the computer or machine may distinguish between bright pixels and dark pixels from input images according to brightness of the pixels, distinguish between simple forms such as edges, and distinguish between more complicated forms and an object. The computer or machine may recognize a form that defines a human face.

The deep learning structure according to the present disclosure may use various known structures. For example, the deep learning structure according to the present disclosure may be a Convolutional Neural Network (CNN), a Recurrent Neural Network (RNN), a Deep Belief Network (DBN), and/or the like.

The RNN may be widely used for natural language processing, etc., and may effective for processing time-series data changing over time, which may construct an artificial neural network structure by stacking layers at each moment.

The DBN is a deep learning structure formed by stacking multiple layers of RBM (Restricted Boltzman Machine), a deep learning technique. When the RBM learning is repeated to reach a predetermined number of layers, a DBN having a corresponding number of layers may be formed.

The CNN, a structure which is particularly widely used in the field of object recognition, may be described with reference to FIG. 7.

The CNN is a model that simulates a person's brain function based on the assumption that a person recognizes an object by extracting basic features of the object and subsequently perform complicated calculations in the brain.

FIG. 7 is a view illustrating the CNN structure. Other views may also be provided.

The CNN may also include an input layer, a hidden layer, and an output layer.

A predetermined input image 710 is input to the input layer.

Referring to FIG. 7, the hidden layer is composed of a plurality of layers, and may include a convolution layer and a sub-sampling layer.

In the CNN, various filters for extracting features of an image through convolution operations and pooling or non-linear activation functions for adding nonlinear characteristics may be basically used together.

Convolution is mainly used in filter processing in image processing and may be used to implement a filter for extracting features from an image.

For example, when the convolution operation is repeatedly performed on the whole image, while moving a window of a predetermined size, an appropriate result may be obtained according to a weight value of the window.

The convolution layer may perform a convolution operation on input image data 710 and 712 using the convolution filter and may generate feature maps 711 and 713 in which the features of the input image 710 are expressed.

As a result of the convolutional filtering, filtering images corresponding to the number of filters can be generated according to the number of filters included in the convolution layer. The convolution layer may include nodes included in the filtered images.

The sub-sampling layer paired with the convolution layer may include the same number of feature maps as that of the convolution layer forming a pair.

The sub-sampling layer may reduce a dimension of the feature maps 711 and 713 through sampling or pooling.

The output layer may recognize the input image 710 by combining various features expressed in the feature map 714.

The area recognition module of the air conditioner may use the various depth learning structures as described above. For example, the CNN structure widely used in object recognition in an image may be used, although the present disclosure is not limited thereto.

Learning of the artificial neural network may be done by adjusting a weight of a connection line between nodes so that a desired output is obtained for a given input. Additionally, the artificial neural network can continuously update the weight value by learning. A method such as back propagation, or the like, may be used in artificial neural network learning.

The area recognition module 150 according to an example embodiment may divide the indoor space into a plurality of areas by using the image obtained by the camera 110 as input data of the artificial neural network previously learned by machine learning, and may classify the plurality of divided areas into a living area and a non-living area The area recognition module 150 may subdivide the living area and divide the plurality of areas into a residential living area, a movement living area, and a living area. The area recognition module 150 may accumulate the position recognition results of the occupant, and may distinguish the living area with respect to the plurality of areas based on the accumulated position recognition result.

The area recognition module 150 may subdivide the living area to classify the plurality of areas into a residing living area, a movement living area, and a non-living area. The area recognition module 150 may accumulate the result of recognizing a location of the occupant, and classify the living area with respect to the plurality of areas based on the result of the accumulated position recognition.

Figure 8:
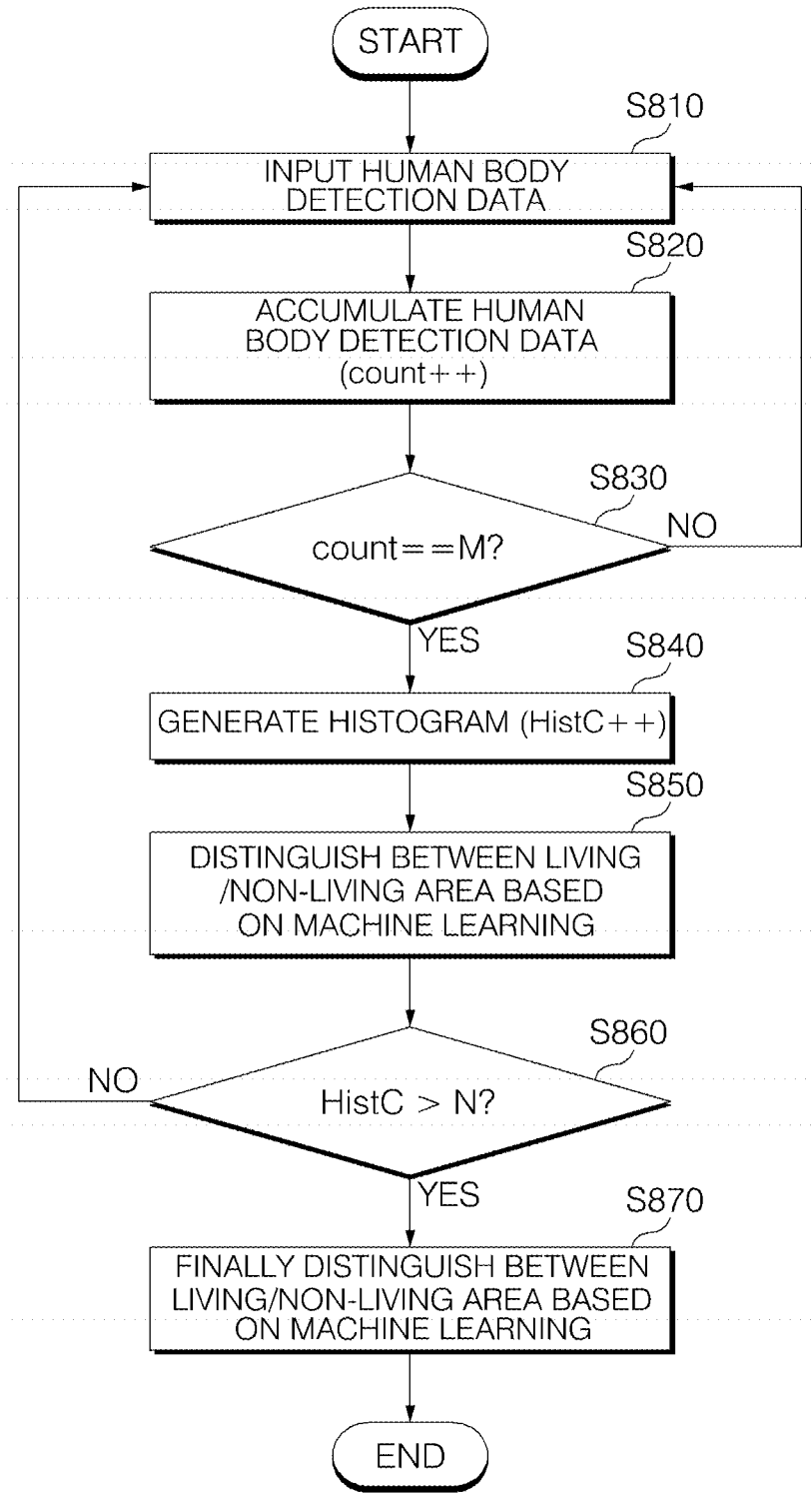
FIG. 8 is a flow chart illustrating a process of recognizing a living area according to an example embodiment.

FIG. 8 is a flow chart illustrating a process of recognizing a living area according to an example embodiment. Other operations, orders of operations and embodiments may be possible. FIG. 8 is a diagram illustrating a process in which the area recognition module 150 or 145 recognizes and distinguishes a living area in an indoor space. FIG. 8 specifically illustrating an example in which the area recognizer 152 according to an exemplary embodiment distinguishes the living area.

Referring to FIG. 8, the area recognizer 152 may receive human body detection data including a result of recognizing a location of an occupant from the human body recognizer 151 (S810) and may accumulate the received human body detection data (S820).

The area recognizer 152 may count the human body detection data while accumulating the data (S830), and when a predetermined number (M) of data or greater is accumulated, the area recognizer 152 may generate (or provide) a histogram (S840).

The area recognizer 152 may distinguish between the living area and the non-living area based on machine learning using the generated histogram as input data (S850).

The machine learning may use a technique such as SVM (Support Vector Machine) or Adaboost, and more preferably, a deep learning technique.

The area recognizer 152 may include an artificial neural network previously learned by machine learning, generate a plurality of histograms for each area, and distinguish the living area and the non-living area using the generated histogram as input data of the artificial neural network. The area recognizer 152 may subdivide the living area into a residential living area and a movement living area.

According to the example embodiment, in order to further increase accuracy of the living area classification, the living area classification (S850) may be repeatedly performed (S860), a plurality of classification results may be collected, and the plurality of areas of the indoor space may be classified into the living area and the non-living area based on the collected results (S870).

That is, when the result of the living area classification is accumulated by more than a predetermined number of times, the final result is derived, thereby securing reliability of the living area recognition result and eliminating a temporary error of the living area caused by a human detection error.

Figure 9:
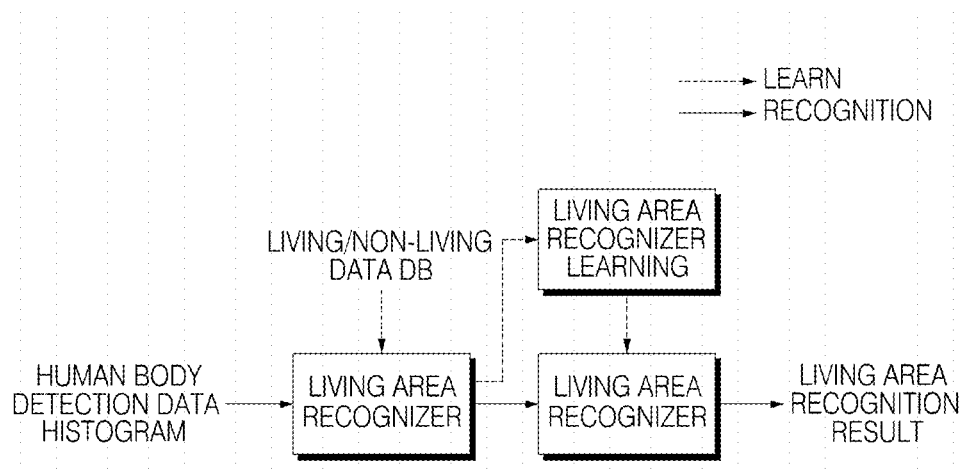
FIG. 9 is a view referred to descriptions regarding an area recognition module according to an example embodiment.

FIG. 9 is a view referred to descriptions regarding an area recognition module according to an example embodiment. Other embodiments and configurations may also be provided.

Referring to FIG. 9, the human body sensing data histogram may be collected to construct a living area/non-living area database (DB), and features may be extracted, and parameters of the neural network (weight and bias) may subsequently be estimated through artificial neural network learning of the area recognizer to obtain a model (dotted line flow).

Such learning may be performed for a predetermined time period when the air conditioner 100 is installed and operated. Even after learning at a set level or higher, whenever the recognition result is derived, updating may be performed by reflecting it on the existing learned model parameter.

Alternatively, at least some of the images captured by the camera may be transmitted to a predetermined server, and the learned data may be received through the predetermined server to update the artificial neural network.

Thereafter, using the learned model parameters, the living area/non-living area may be recognized (or determined) based on an image obtained and newly input by the camera 110 (i.e., solid line flow).

Figure 10:
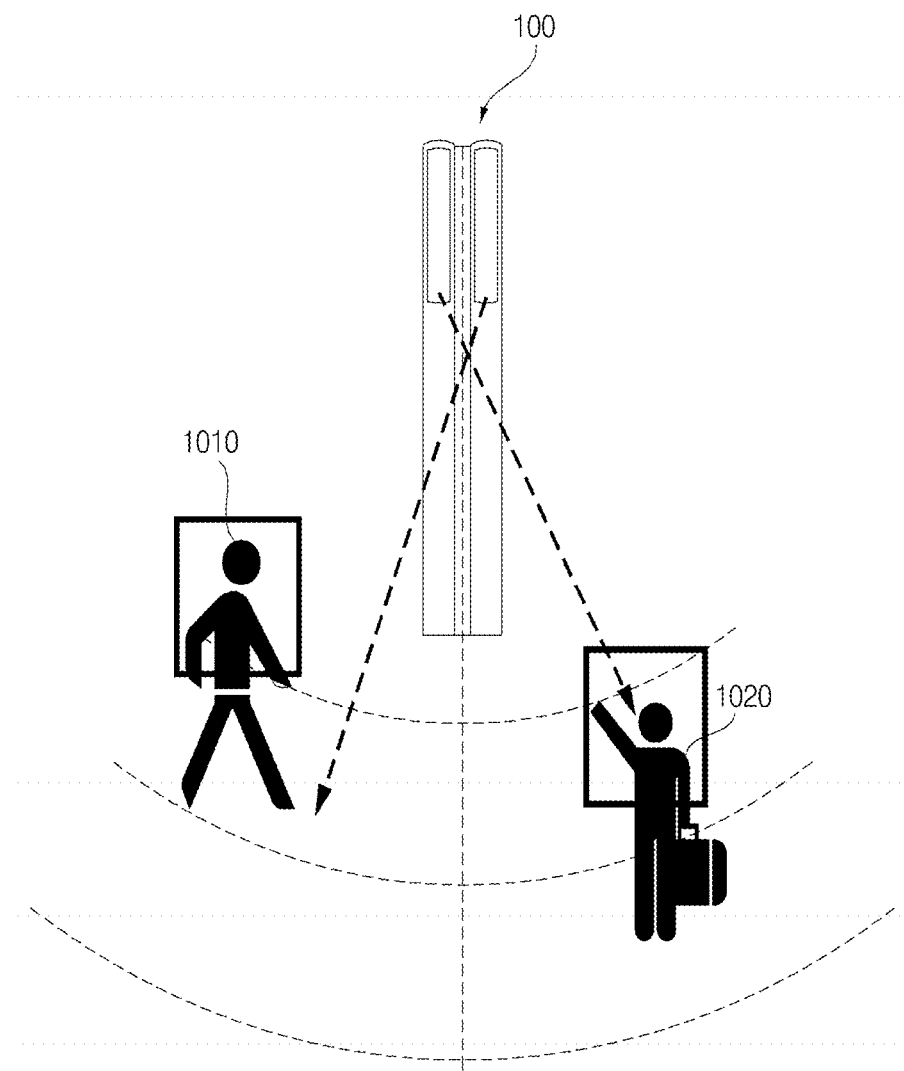
FIGS. 10 to 12 views referred to descriptions regarding a control method of an air conditioner according to an example embodiment.
Figure 11:
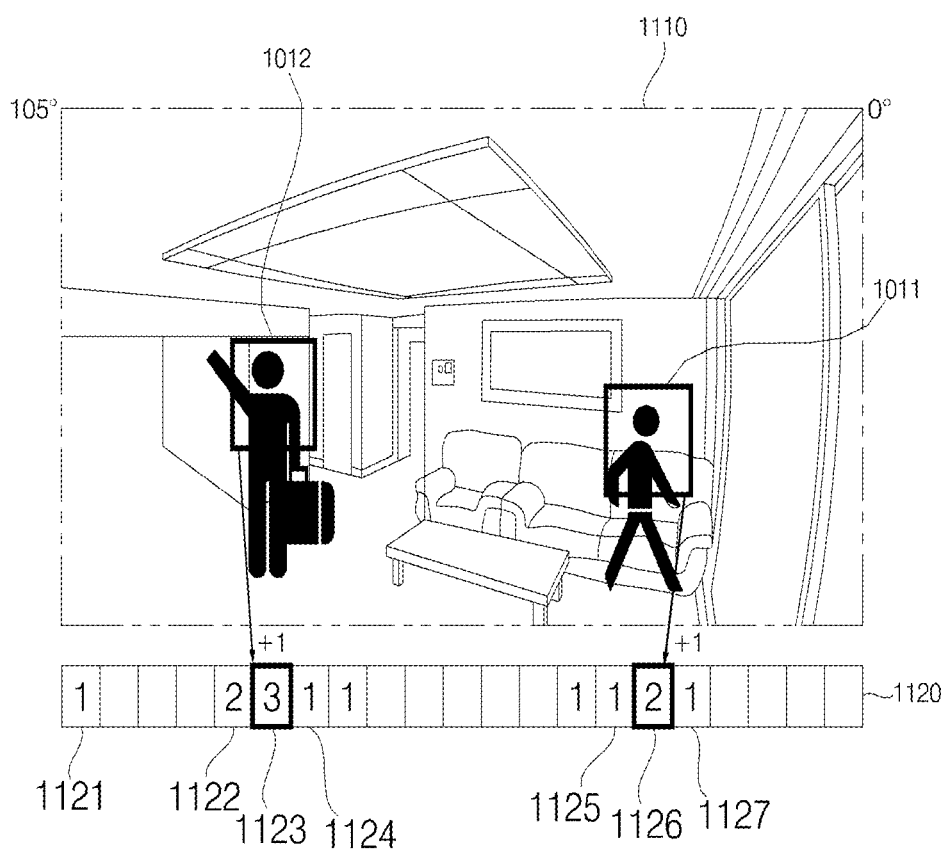
Figure 12:
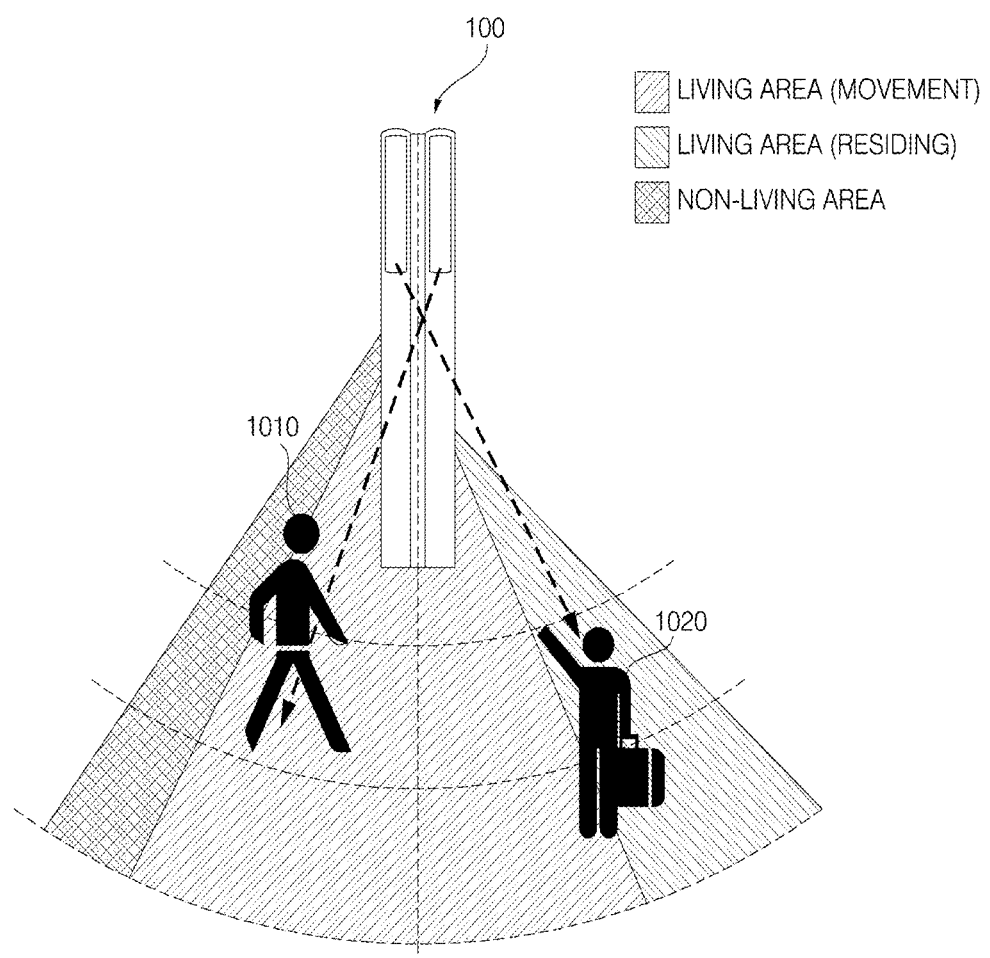

FIGS. 10 to 12 views referred to descriptions regarding a control method of an air conditioner according to an example embodiment. Other embodiments and configurations may also be provided. An algorithm for determining a user's actual living area according to an example embodiment may be described.

Referring to FIG. 10, the air conditioner 100 may image the indoor space through the camera to obtain an image and recognize presence and absence and locations of occupants 1010 and 1020 in the obtained image.

In this example, the location information of the recognized occupants 1010 and 1020 may include angle information ang1 and ang2. The location information of the recognized occupants 1010 and 1020 may further include distance information (i.e., short distance, middle distance, long distance).

FIG. 11 illustrates an example of generating (or providing) a histogram 1120 reflecting the image 1110 obtained by the camera and the locations 1011 and 1012 of the occupants recognized from the image 1110 obtained by the camera. Other embodiments and views may also be provided.

The histogram 1120 (shown in FIG. 11) may be generated to correspond to a plurality of areas arranged in a left-to-right direction of the image obtained by the camera. For example, the histogram 1120 may be generated by dividing the angles of 0 to 105 degrees corresponding to the entire area into predetermined unit angles and accumulating frequency of occupant detection by divided angles.

In the example of additionally utilizing the distance information, the histogram may be generated in a matrix type in which detection frequency by distances and angles have a plurality of rows and columns.

The histogram 1120 may include a plurality of cells 1121, 1122, 1123, 1124, 1125, 1126 and 1127 respectively corresponding to a plurality of areas, and when an occupant is recognized in an area corresponding to each of the cells 1121, 1122, 1123, 1124, 1125, 1126, and 1127, recognition results may be added up and accumulated.

FIG. 11 illustrates an example in which the values of two cells 1123 and 1126 are increased by 1 based on reflecting positions 1011 and 1012 of the occupant recognized in the image 1110 obtained by the camera.

As shown in FIG. 11, the histogram 1120 may be generated by accumulating occupant recognition results, and living area classification may be performed when the occupant recognition results are equal to or greater than a reference number. That is, area determination may be performed by accumulating a predetermined time or a predetermined number of occupant recognition results.

According to an example embodiment, a recognition result of one time may not be reflected at an equivalent level but a weight may be reflected on a specific recognition result. For example, a higher weight may be given to the same location in which an occupant is continuously recognized or a location with high recognition frequency within a predetermined period. In order to improve accuracy, an (residence/movement) area and a non-living area may be finally distinguished by analyzing the algorithm based on deep learning when a predetermined number of the living area classification results or greater is accumulated. By applying the deep learning algorithm, robustness and reliability can be obtained.

Thereafter, as shown in FIG. 12, the air conditioner 100 may perform airflow control based on the distinguished living area. For example, the air conditioner 100 can control airflow differently depending on the residential living area, the movement living area, and the non-living area. Further, the air conditioner 100 may control airflow such that the residential living area is first cooled.

The air conditioner can perform the airflow control customized for a living environment and space. Since the air conditioner operates by itself according to an environment and intensively cools only the living area, loss of airflow may be removed to reduce energy consumption and enhance cooling efficiency of the actual living space.

Since the air conditioner distinguishes the living area using the artificial neural network previously learned by deep learning, reliability of the living area classification may be enhanced.

Additionally, since the artificial neural network is updated based on data received from a predetermined server, the latest artificial neural network learned to a level higher than that provided by the manufacturer or service provider may be used.

Figure 13:
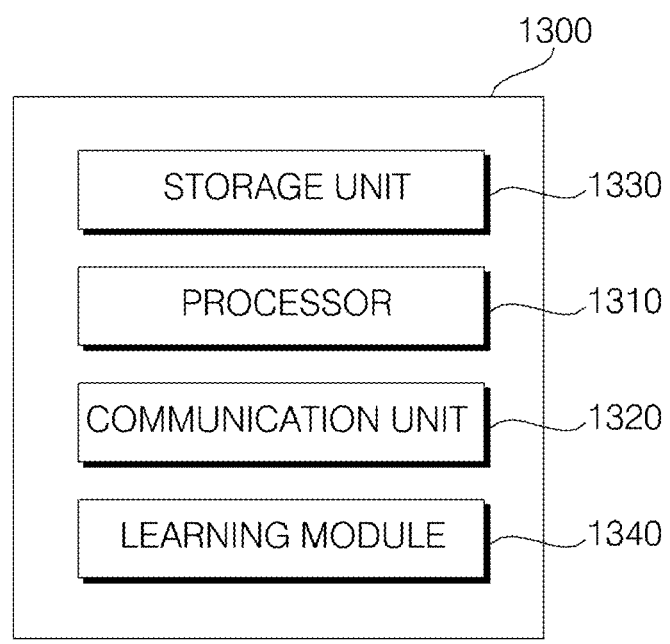
FIG. 13 is an internal block diagram of a server according to an example embodiment.

FIG. 13 is an internal block diagram of a server according to an example embodiment. Other embodiments and configurations may also be provided.

Referring to FIG. 13, a server 1300 may include a communication unit 1320, a storage unit 1330, a learning module 1340, and a processor 1310.

The processor 1310 may control overall operation of the server 1300.

The server 1300 may be a server operated by a manufacturer of a home appliance such as an air conditioner or a server operated by a service provider, and/or may be a kind of a cloud server.

The communication unit 1320 may receive various data (such as status information, operation information, and the like) from a home appliance (such as a mobile terminal or an air conditioner, and the like) and a gateway, or the like.

The communication unit 1320 can transmit data corresponding to the received various information to a home appliance (such as a portable terminal or an air conditioner) and a gateway.

The communication unit 1320 may include one or more communication modules such as an Internet module and a mobile communication module.

The storage unit 1330 may store the received information and may have data for generating result information corresponding thereto.

The storage unit 1330 may store data used for machine learning, result data, and/or the like.

The learning module 1340 may serve as a learning device of a home appliance such as the air conditioner.

The learning module 1340 may include an artificial neural network, e.g., a Deep Neural Network (DNN) such as a Convolutional Neural Network (CNN), a Recurrent Neural Network (RNN), DBN (Deep Belief Network), and/or the like.

As a learning method of the learning module 1340, both unsupervised learning and supervised learning may be used.

The controller 1310 may perform control to update the artificial neural network structure of the home appliance such as the air conditioner to the learned artificial neural network structure after learning according to the setting.

FIGS. 14 to 19 are views relating to descriptions regarding a control method of an air conditioner according to an example embodiment, illustrating examples of controlling airflow regarding a classified area based on a swing operation. Other embodiments and configurations may also be provided.

Figure 14:
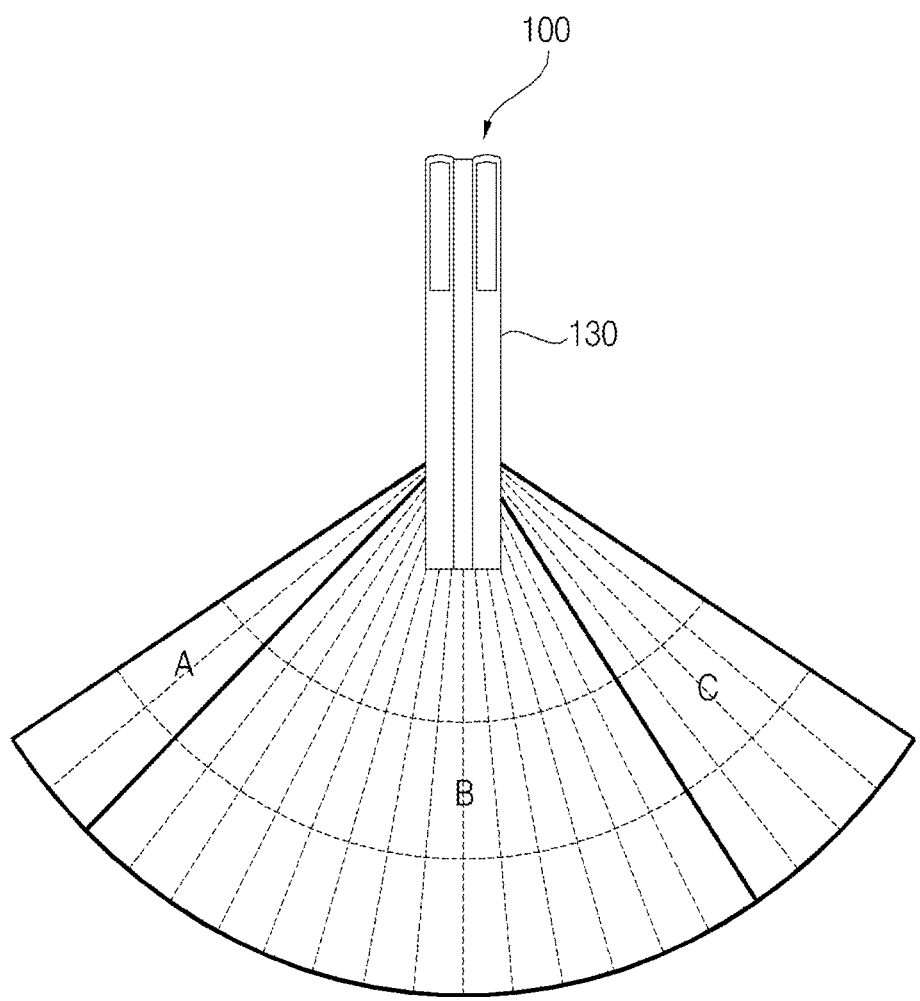
FIGS. 14 to 19 are views relating to descriptions regarding a control method of an air conditioner according to an example embodiment.

Referring to FIG. 14, a target indoor space may be divided into a plurality of areas with respect to coordinates using a location distinguished by a range angle in a planar direction based on the air conditioner 100 as a central point (as an X axis), and a location distinguished by a linear distance in a planar direction based on the air conditioner 100 (as a Y axis).

Alternatively, the target indoor space may be divided into a plurality of areas by a range angle in the planar direction with the air conditioner 100 as a central point. For example, the target indoor space may be divided into a plurality of areas in units of 5 degrees.

The air conditioner 100 according to an example embodiment may divide the plurality of areas of the target indoor space into living areas A and B and a non-living area C according to frequency with which an occupant is recognized (i.e., the number of times a person is detected per unit time or a time duration in which a person is detected).

For example, the area recognition module (150 in FIG. 1) may distinguishably classify a divided section in which an occupant has been detected at least once and a divided section in which no person has been detected, among the divided areas and distinguish between living areas A and B in which a person has been detected and a non-living area C in which no person has been detected.

A criterion for classifying the living areas A and B and the non-living area C is not limited to whether or not the occupant is detected in the corresponding area and the number of times or a time based on which an area is hardly admitted as an area in which a person lives may also be used as a reference of the living areas A and B and the non-living area C.

According to an example embodiment, each area divided into the living areas A and B may be divided into a residential living area A and a movement living area B according to the number of times or a time in which the occupant is continuously detected.

For example, the area recognition module 150 may classify each area classified as the living areas A and B into any one of the residual living area A and the movement living area B according to the number of times or a time in which a person is continuously detected, whereby the living areas A and B may be classified into two subdivided areas (i.e., the residual living area A and the movement living area B).

The air conditioner 100 may control airflow according to the divided areas. The airflow controller (141 of FIG. 1) may control strength of airflow by controlling the fan motor of the blower 130 provided in the air conditioner 100 and control a direction and a range of airflow by controlling the wind direction adjusting unit (such as a vane, a louver, and the like) provided in the discharge port (190 of FIG. 1).

For example, control according to an intensive cooling/heating mode for intensively transmitting airflow toward the residential living area A, control according to the direct heating/cooling mode for transmitting airflow toward the living areas A and B, and control according to an indirect cooling/heating mode in order to prevent direct airflow to the residential living area A may be performed.

Figure 15:
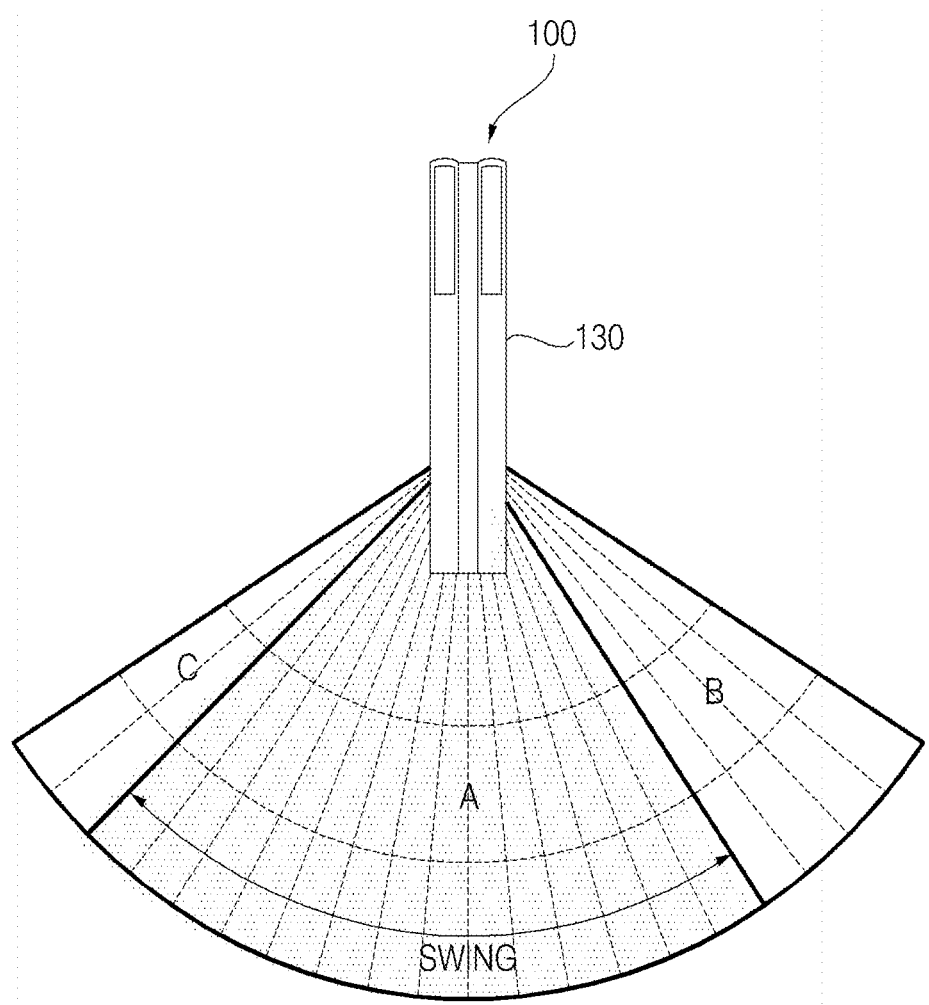

Referring to FIG. 15, in the intensive cooling/heating mode, a direction of airflow can be controlled so that airflow is transmitted only toward the resident living area A.

In the intensive heating/cooling mode, since air blows such that airflow is not transmitted to other areas except for the residential living area A (i.e., the non-living area C and the movement living area B) and airflow is transmitted only to the residential living area A, intensive cooling or heating can be performed only on the area in which the person actually resides.

As a result, since intensive cooling or heating is performed on the residential living area A in which a person actually resides to quickly lower or increase a temperature of the corresponding area, user's comfort may be quickly increased even when a temperature in a room is very high or when the user is immediately home and feels very hot, or may rapidly increase a temperature to make the user feel warm even when a temperature of a room is very low or the user feels cold immediately after he is home.

Additionally, in the intensive cooling/heating mode, since air blows such that airflow is not transmitted to the non-living area C but transmitted only to the living areas A and B, cooling or heating may be intensively performed on the area where the person actually resides.

As a result, since a temperature of the area requiring rapid cooling or heating can be rapidly lowered or raised, while reducing an unnecessary waste of energy, an effect of increasing user satisfaction, while enhancing energy efficiency, is provided.

Figure 16:
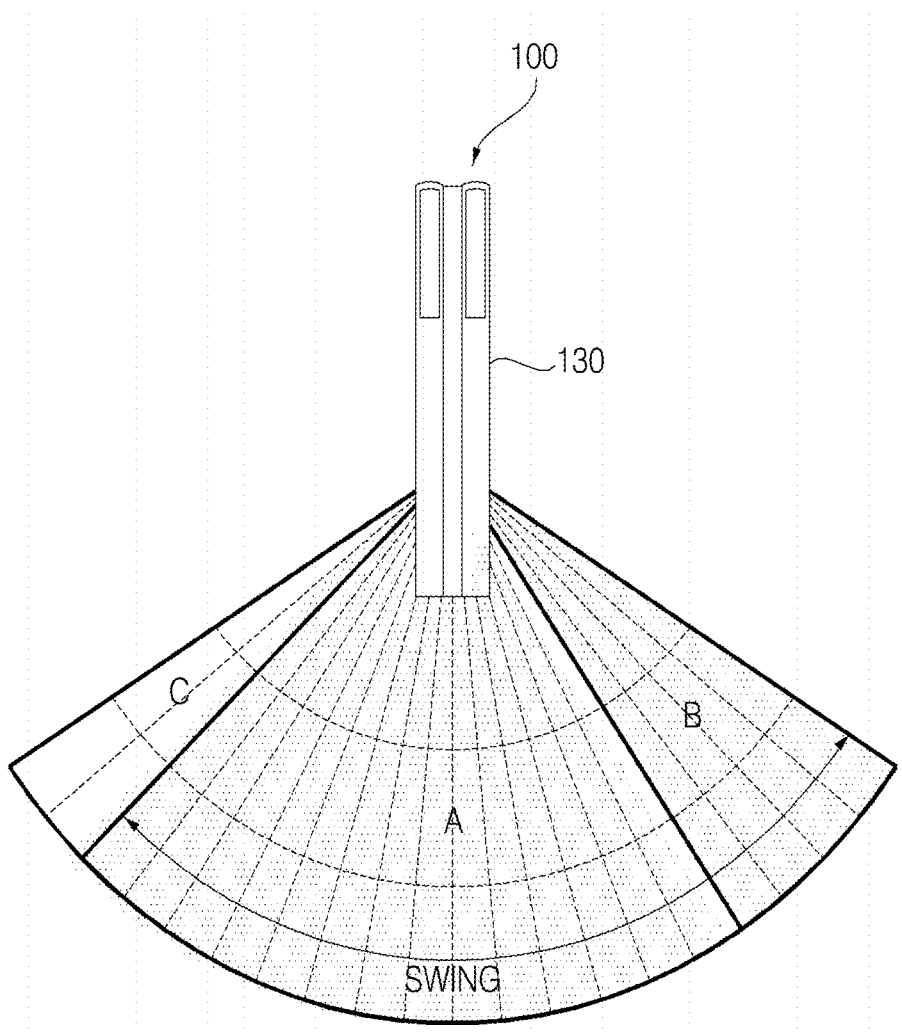

Referring to FIG. 16, in the direct heating and cooling mode, airflow may be controlled so as to be transmitted only toward the living areas A and B.

In this direct heating and cooling mode, air blows to the entire living areas A and B including the residential living area A and the movement living area B without blowing air only to the living area C.

In the example of cooling or heating performed by the intensive cooling/heating mode, since air blows in a direct wind form in a direction toward the residential living area A (i.e., in a direction directly toward the person), and thus when the person is exposed to the state for a long period of time, the user may feel cold and user comfort may rather be lowered.

In the direct heating and cooling mode, air blowing is performed on the entire living areas A and B including the residential living area A and the movement living area B. That is, since air blowing in a direct wind form directly toward a person and air blowing in an indirect wind form not directly toward a person are alternately performed, user comfort may be increased, while reducing frequency at which the person is directly exposed to cold air or hot air.

In the direct heating/cooling mode, since air blows such that airflow is not transmitted to the non-living area C and airflow is transmitted only to the living areas A and B, cooling and heating may be performed such that unnecessary cooling heat is not performed on an area in which a person does not live and cooling and heating are intensively performed on an area in which a person actively lives.

As a result, it may be possible to rapidly reduce a temperature of the area in which a person actually lives, while reducing a waste of unnecessary energy, so that it has an effect of increasing user satisfaction, while enhancing energy efficiency is provided.

In another example of the direct heating and cooling mode, a swing operation of the vane may be controlled such that a larger amount of airflow is transmitted to the residential living area A when airflow is transmitted to the entire living areas A and B.

Figure 17:
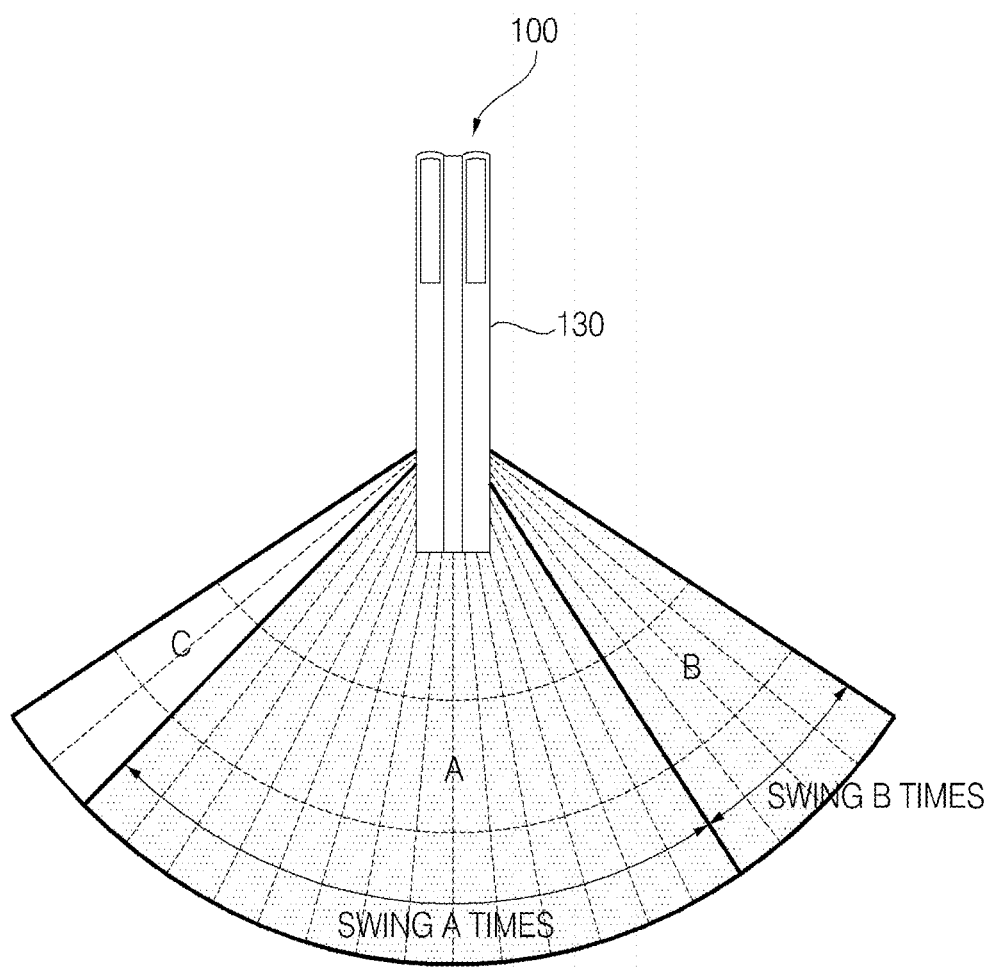
Figure 18:
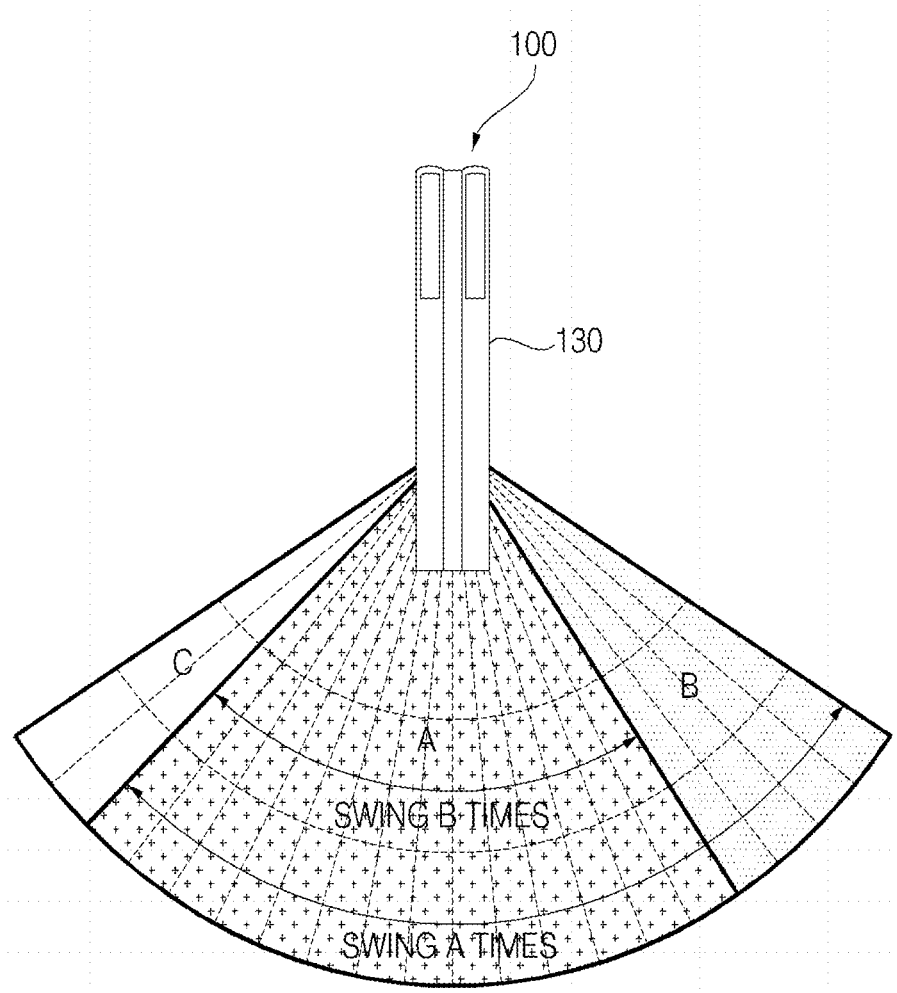

As shown in FIG. 17, in an example of controlling airflow, the airflow controller 141 may control airflow such that a residential living area cooling/heating operation to transmit airflow only to the residential living area A and a movement living area cooling/heating operation to transmit airflow only to the movement living area B are alternately performed.

In this example, in the residential living area cooling/heating operation, a swing operation of the vane is controlled such that airflow is transmitted only to the residential living area A, and in the movement living area cooling/heating operation, a swing operation of the vane is controlled such that airflow is transmitted only to the movement living area B.

In this manner, airflow is controlled such that the residential living area cooling/heating operation and the movement living area cooling/heating operation are alternately performed, and in an example where cooling or heating is intended to be more intensively performed on the residential living area A, the operation of the vane may be controlled in the form of further increasing the number of times of performing the residential living area cooling/heating operation, compared with the movement living area cooling/heating operation. In the opposite example, the operation of the vane may be controlled in the form of further decreasing the number of times of performing the residential living area cooling/heating operation, compared with the movement living area cooling/heating operation. In this manner, cooling or heating may be changed.

In another example of controlling airflow described above, as shown in FIG. 18, the airflow controller 141 controls airflow such that the living area cooling/heating operation to transmit airflow toward the entire living area and the residential living area cooling/heating operation to transmit airflow only toward the residential living area A are alternately performed.

In the living area cooling/heating operation, a swing operation of the vane may be controlled such that airflow is evenly transmitted to the entire living areas A and B and, in the residential living area cooling/heating operation, the swing operation of the vane is controlled such that airflow is transmitted only to the residential living area A.

In this manner, airflow is controlled such that the living area cooling/heating operation and the residential living area cooling/heating operation are alternately performed, and in example where cooling or heating is intended to be more intensively performed on the residential living area A, the operation of the vane may be controlled in a form of further increasing the number of times of performing the residential living area cooling/heating operation, compared with the living area cooling/heating operation. In the opposite example, the operation of the vane may be controlled in a form of further reducing the number of times of performing the residential living area cooling/heating operation, compared with the living area cooling/heating operation. In this manner, cooling and heating may be changed.

When the living area cooling/heating operation and the residential living area cooling/heating operation are alternately performed, since air blows to the entire living areas A and B, cooling or heating is performed on the entire living areas A and B but air blow more to the residential living area A, whereby a temperature of the area where the person resides actually may be more rapidly lowered to enhance comfort the person may actually feel.

Figure 19:
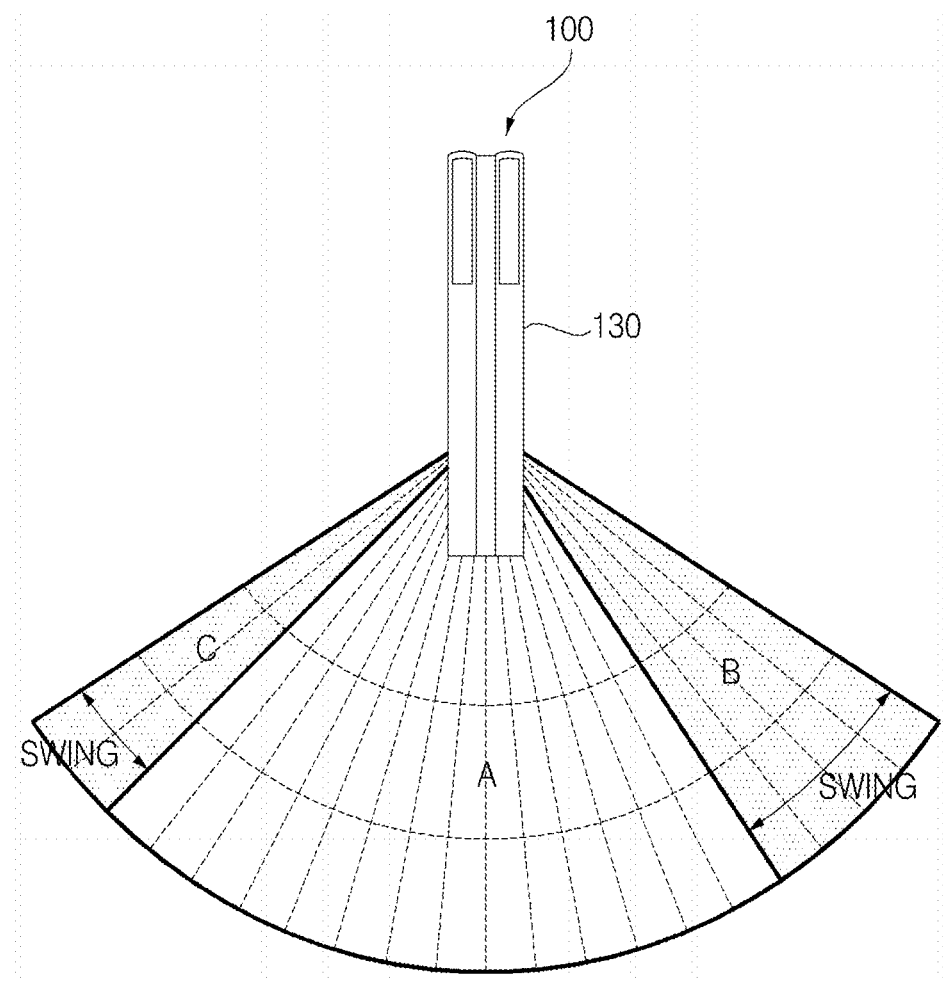

In the indirect cooling/heating mode, as shown in FIG. 19, airflow may be controlled such that an indirect cooling/heating operation is performed to transmit airflow only to the non-living area C and the movement living area B, except for the residential living area A.

The indirect cooling/heating operation may be performed by controlling a swing operation of the vane to transmit airflow only to the non-living area C and the movement living area B.

In the indirect cooling/heating mode in which the indirect cooling/heating operation is performed, airflow is controlled such that air does not blow to the residential living area A and air blows only to the non-living area C and the movement living area B, whereby airflow of cold air or hot air discharged by the air conditioner 100 is not directly exposed to the person.

According to at least one embodiment, an air conditioner having improved cooling efficiency and energy efficiency and a control method thereof can be provided through occupant recognition with improved accuracy.

According to at least one embodiment, optimized airflow may be controlled according to installation environments and the indoor space.

Additionally, according to at least one embodiment, the indoor space can be divided into living areas based on machine learning, and the airflow control function can be efficiently performed.

The configuration and method of the air conditioner according to the example embodiments are not limited in its application, but the entirety or a portion of the embodiments may be selectively combined to be configured into various modifications.

The control method of the air conditioner may be implemented as codes that can be read by a processor in a processor-readable recording medium. The processor-readable recording medium may include any type of recording devices in which data that can be read by the processor is stored. The processor-readable recording medium may include a ROM, a RAM, a CD-ROM, a magnetic tape, a floppy disk, an optical data storage device, and the like. The processor-readable medium also includes implementations in the form of carrier waves or signals, e.g., transmission via the Internet. The processor-readable recording medium may be distributed over network-coupled computer systems so that the processor-readable code may be stored and executed in a distributed fashion.

An aspect of the present disclosure may provide an air conditioner with improved cooling efficiency and energy efficiency through occupant recognition with improved accuracy, and a control method thereof.

Another aspect of the present disclosure may provide an air conditioner capable of controlling an optimized airflow according to installation environments and indoor spaces, and a control method thereof.

Another aspect of the present disclosure may provide an air conditioner capable of dividing an indoor space into living areas based on machine learning and efficiently performing an airflow control function, and a control method thereof.

In at least one aspect, an air conditioner may include: a camera obtaining an external image; an area recognition module recognizing an area in which an occupant is located in an indoor space divided into a plurality of areas from the image obtained by the camera and distinguishing a living area with respect to the plurality of areas based on a result of recognizing a location of the occupant; and an airflow controller controlling airflow based on the distinguished living area, whereby airflow optimized for each living area of the indoor space may be controlled.

In at least one aspect, a control method of an air conditioner may include: obtaining an external image through a camera; recognizing an area in which an occupant is located in an indoor space divided into a plurality of areas from the image obtained by the camera; distinguishing a living area with respect to the plurality of areas based on a result of recognizing a location of the occupant; and controlling airflow based on the distinguished living area.

According to at least one embodiment, an air conditioner having improved cooling efficiency and energy efficiency and a control method thereof can be provided through occupant recognition with improved accuracy.

According to at least one embodiment, optimized airflow may be controlled according to installation environments and the indoor space.

Additionally, according to at least one embodiment, the indoor space can be divided into living areas based on machine learning, and the airflow control function can be efficiently performed.

Other effects may be explicitly or implicitly disclosed by the detailed description of the embodiments.

It will be understood that when an element or layer is referred to as being "on" another element or layer, the element or layer can be directly on another element or layer or intervening elements or layers. In contrast, when an element is referred to as being "directly on" another element or layer, there are no intervening elements or layers present. As used herein, the term "and/or" includes any and all combinations of one or more of the associated listed items.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the disclosure are described herein with reference to cross-section illustrations that are schematic illustrations of idealized embodiments (and intermediate structures) of the disclosure. As such, variations from the shapes of the illustrations as a result, for example, of manufacturing techniques and/or tolerances, are to be expected. Thus, embodiments of the disclosure should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to affect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. An air conditioner comprising:
a camera that obtains an image of an indoor space;
an area recognition device that determines, from the image obtained by the camera, a location of an occupant in the indoor space that is separated into a plurality of areas, and the area recognition device distinguishes a living area with respect to the plurality of areas based on a result of determining the location of the occupant; and
an airflow controller that controls airflow of the air conditioner based on the distinguished living area, and
wherein the area recognition device separates the plurality of areas into a residential living area, a movement living area, and a non-living area,
the airflow controller controls the airflow differently depending on the residential living area, the movement living area, and the non-living area, and controls airflow for cooling the residential living area first and before cooling the movement living area and the non-living area; and wherein the area recognition device includes:
- a human body recognizer that determines, from the image obtained from the camera, presence or absence of the occupant and the location of the occupant,
- an area recognizer that distinguishes the living area with respect to the plurality of areas based on a result of determining the location of the occupant, and
- a signal generator that provides an airflow control signal based on the distinguished living area, and wherein a direction of airflow is controlled so that airflow is transmitted only toward the resident living area in an intensive cooling/heating mode, wherein the direction of airflow is controlled so as to be transmitted only toward the living area in a direct heating and cooling mode, wherein the direction of airflow is controlled such that an indirect cooling/heating operation is performed to transmit airflow only to the non-living area and the movement living area, except for the residential living area in an indirect cooling/heating mode, wherein the area recognition device accumulates results of determining the location of the occupant to a histogram, and distinguishes the living area with respect to the plurality of areas based on the accumulated results of determining the location of the occupant, wherein the histogram is generated in a matrix type in which detection frequency by distances and angles have a plurality of rows and columns.

2. The air conditioner of claim 1, wherein the airflow controller controls a fan motor or a wind direction adjusting device based on the distinguished living area.

3. The air conditioner of claim 1, wherein the area recognition device distinguishes the living area with respect to the plurality of areas using the result of determining the location of the occupant as input of data previously learned by machine learning.

4. The air conditioner of claim 1, wherein the area recognition device includes an artificial neural network that is previously learned by machine learning, and
- the area recognition device accumulates the result of determining the location of the occupant and provides the histogram that includes information on the plurality of areas, and the area recognition device distinguishes the living area by using the histogram as input data of the artificial neural network.

5. The air conditioner of claim 1, further comprising:
a communication device that receives, from a server, data related to machine learning,
wherein the area recognition device is updated based on the data, received from the server, related to machine learning.

* * * * *